US012786574B2

(12) United States Patent
Nohara

(10) Patent No.: US 12,786,574 B2
(45) Date of Patent: Nov. 3, 2026

(54) IMAGE CAPTURING APPARATUS CAPABLE OF ACQUIRING IMAGE BALANCED IN LIGHT PORTIONS AND DARK PORTIONS, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Naoto Nohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 19/083,650

(22) Filed: Mar. 19, 2025

(65) Prior Publication Data

US 2025/0310651 A1 Oct. 2, 2025

(30) Foreign Application Priority Data

Mar. 26, 2024 (JP) ................................ 2024-049565

(51) Int. Cl.
*H04N 23/73* (2023.01)
*H04N 23/611* (2023.01)

(52) U.S. Cl.
CPC ........... *H04N 23/73* (2023.01); *H04N 23/611* (2023.01)

(58) Field of Classification Search
CPC ...... H04N 23/73; H04N 23/611; H04N 23/71; H04N 7/15; H04N 23/88; G06T 5/50; G06T 7/20; G06T 7/30; G06T 2207/20221; G06T 2207/30168; G06T 2207/30201; G06T 5/92; G06V 10/56; G06V 10/60; G06V 20/35; G06V 20/05
See application file for complete search history.

(56) References Cited

U.S. PATENT DOCUMENTS

2009/0207281 A1* 8/2009 Ono .................... H04N 23/667 348/E9.053
2010/0201843 A1* 8/2010 Fukui .................. H04N 23/611 348/E5.037
2016/0360107 A1* 12/2016 Nabeshima ........... G06F 1/3231
2017/0132459 A1* 5/2017 Sunkavalli ................ G06T 5/94
2018/0341804 A1* 11/2018 Takayama ................. G06T 5/94
2019/0182408 A1* 6/2019 Watanabe ................. G06T 5/70
2021/0306543 A1* 9/2021 Kogure ................ H04N 23/611
2025/0193339 A1* 6/2025 Lukac .................... G06V 10/60

FOREIGN PATENT DOCUMENTS

JP 2006024132 A 1/2006
JP 2009027352 A 2/2009

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image capturing apparatus capable of acquiring an image balanced in light portions and dark portions. A face area and a skin area of a person are detected from an image captured by an image sensor. Representative luminance values of light portions and dark portions in a within-face skin area are calculated. A degree of slanting of light in the within-face skin area is determined, based on the representative luminance values of the light portions and the dark portions. An exposure correction amount for correcting exposure at time of image capturing by the image sensor is corrected based on the degree of slanting of light.

16 Claims, 16 Drawing Sheets

10

IMAGE CAPTURING APPARATUS CAPABLE OF ACQUIRING IMAGE BALANCED IN LIGHT PORTIONS AND DARK PORTIONS, METHOD OF CONTROLLING IMAGE CAPTURING APPARATUS, AND STORAGE MEDIUM

BACKGROUND

Technical Field

The aspect of the embodiments relates to an image capturing apparatus capable of acquiring an image balanced in light portions and dark portions, a method of controlling the image capturing apparatus, and a storage medium.

Description of the Related Art

In a digital camera or a smartphone which performs image capturing using an image sensor, such as a CMOS sensor, in general, exposure correction is automatically performed such that an image captured by the image sensor has proper luminance as a whole. The exposure correction is performed by detecting luminance of the image captured by the image sensor, pixel by pixel, or predetermined block by predetermined block, and making an average luminance of all pixels equal to a fixed value.

In a case where a main object is a person, the exposure is sometimes determined such that the average luminance of a face area of the person becomes a predetermined value. In this case, if the scene is a slanting light scene in which light is incident on the face of the person from a slanting direction, the average luminance is largely influenced by an area on which strong light is incident, whereby a correction amount is shifted toward a high luminance side. As a result, in a dark portion (shade area), blackouts occur to make the impression of the image dark, or to the contrary, in a light portion (portion on which strong light is incident), white outs occur to make the impression of the image too light.

Japanese Laid-Open Patent Publication (Kokai) No. 2006-24132 proposes a technique in which luminance of a skin area is analyzed to determine whether or not image capturing is performed in a light slanting state, and brightness of the image is corrected based on a degree of slanting of the light. Further, Japanese Laid-Open Patent Publication (Kokai) No. 2009-27352 proposes a technique in which the brightness of an image is corrected by weighting the luminance of pixels in a high-luminance area and the luminance of pixels in a low-luminance area, of a histogram of luminance values in a skin color area, according to backlight or frontlight.

SUMMARY

According to a first aspect of the embodiments, there is provided an image capturing apparatus including at least one processor or circuit configured to function as a first detection unit configured to detect a face area of a person, from an image captured by an image sensor, a second detection unit configured to detect a skin area from the image, a first calculation unit configured to calculate a representative luminance value of light portions and a representative luminance value of dark portions in a within-face skin area which is a skin area detected in the face area, a first determination unit configured to determine a degree of slanting of light in the within-face skin area, based on the representative luminance value of the light portions and the representative luminance value of the dark portions, and a correction unit configured to calculate an exposure correction amount for correcting exposure at time of image capturing by the image sensor, based on the degree of slanting of light.

According to a second aspect of the embodiments, there is provided an image capturing apparatus including a first detection unit configured to detect a face area of a person, from an image captured by an image sensor, a second detection unit configured to detect a skin area from the image, a first calculation unit configured to calculate a representative luminance value of light portions and a representative luminance value of dark portions in a within-face skin area which is a skin area detected in the face area, and a correction unit configured to calculate, in a case where the representative luminance value of the light portions is higher than a first threshold value and at the same time the representative luminance value of the dark portions is lower than a second threshold value which is lower than the first threshold value, an exposure correction amount for correcting exposure at time of image capturing by the image sensor, such that a difference between the representative value of the light portions and the first threshold value, and a difference between the representative luminance value of the dark portions and the second threshold value become equal to each other.

According to a third aspect of the embodiments, there is provided an image capturing apparatus including a first detection unit configured to detect a face area of a person, from an image captured by an image sensor, a second detection unit configured to detect a skin area from the image, a first calculation unit configured to calculate a representative luminance value of light portions and a representative luminance value of dark portions in a within-face skin area which is a skin area detected in the face area, a first determination unit configured to determine a correction parameter for the light portions, based on the representative luminance value of the light portions, and determine a correction parameter for the dark portions, based on the representative luminance value of the dark portions, a generation unit configured to generate data for performing gradation correction of luminance values of the image, based on the correction parameter for the light portions and the correction parameter for the dark portions, and a correction unit configured to correct the luminance values of the image by using the data.

Further features of the disclosure will become apparent from the following description of exemplary embodiments (with reference to the attached drawings).

DESCRIPTION OF THE EMBODIMENTS

Figure 1:
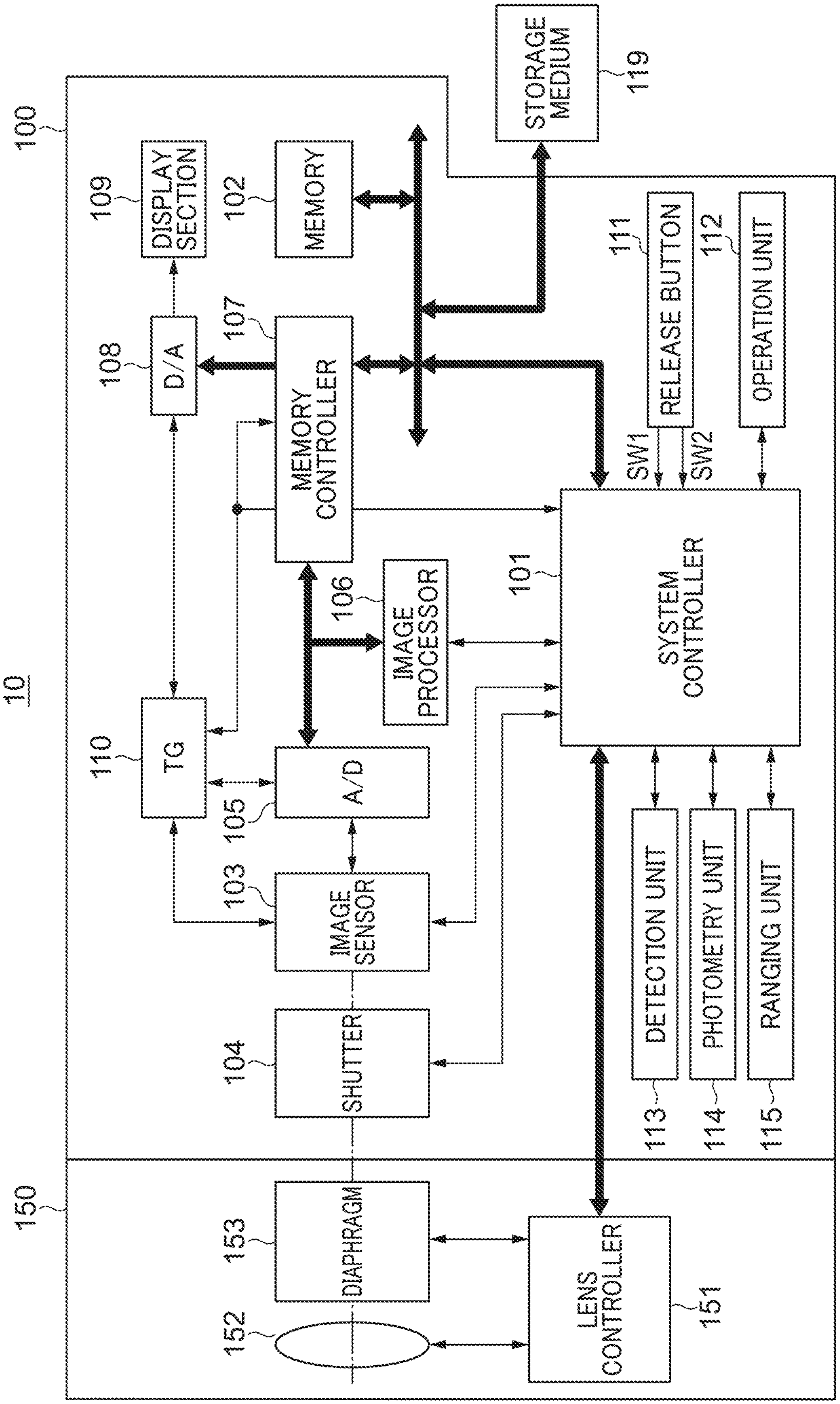
FIG. 1 is a block diagram showing a schematic configuration of an image capturing system according to an embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

FIG. 1 a block diagram showing a schematic configuration of an image capturing system 10 according to an embodiment. The image capturing system 10 is comprised of an image capturing apparatus 100, and a lens barrel 150 removably attached to the image capturing apparatus 100.

The image capturing apparatus 100 is a so-called digital camera, and includes a system controller 101, a memory 102, an image sensor 103, a shutter 104, an analog-to-digital (A/D) converter 105, an image processor 106, a memory controller 107, a digital-to-analog (D/A) converter 108, a display unit 109, and a timing generator (TG) 110. The image capturing apparatus 100 further includes a release button 111, an operation unit 112, a storage medium 119, a detection unit 113, a photometry unit 114, and a ranging unit 115. The lens barrel 150 is a so-called interchangeable lens, and includes a lens controller 151, a lens group 152, and a diaphragm 153.

In the image capturing apparatus 100, the system controller 101 is a micro computer comprised of a central processing unit (CPU) and memories, such as a read only memory (ROM) and a read access memory (RAM), and performs centralized control of the operations of the image capturing system 10. The shutter 104 controls exposure to the image sensor 103 according to a control signal from the system controller 101. The image sensor 103 is a charge accumulation-type photoelectric conversion device, such as a CMOS sensor, which photoelectrically converts an optical image formed on an imaging surface by light incident through the lens barrel 150 to generate analog image data, and outputs the analog image data to the A/D converter 105. The A/D converter 105 converts the analog image signals transmitted from the image sensor 103 to digital image signals and transmits the converted digital image signals to the memory controller 107 and the image processor 106.

The image processor 106 performs image interpolation processing, resizing processing, color conversion processing, correction processing of saturated pixels and black-out pixels, and so forth, on the digital image signals transmitted from the A/D converter 105 and the image data transmitted from the memory controller 107. The memory 102 temporarily stores digital image signals output from the A/D converter 105, a variety of data including image data subjected to a predetermined image processing by the image processor 106, and so forth. The D/A converter 108 converts image data read out from the memory 102 into analog image signals for display, and transmits the analog image signals to the display unit 109.

The display unit 109 includes a liquid crystal panel, and displays a menu screen and an image based on the analog image signals for display, which are transmitted from the D/A converter 108. By performing digital-to-analog conversion of image data obtained by subjecting image data output from the A/D converter 105 to the predetermined image processing, by the D/A converter 108, for display on the display unit 109, whereby it is possible to perform live view display. The TG 110 transmits timings related to operations in the camera, including a driving timing of the image display 103, a timing of changing a frame rate, respective timings of exposure and blocking of light to the image sensor 103 by the shutter 104, and so forth, to components of the image capturing apparatus 100.

The release button 111 is formed by a two-step switch that generates a SW1 signal by halfway of a depressing operation (half depressing), and generates a SW2 signal by completion of the depressing operation (full depressing). Upon receipt of the SW1 signal, the system controller 101 performs photographing preparation operations, such as ranging calculation and photometry calculation, and upon receipt of the SW2 signal, the system controller 101 performs photographing operation. The operation unit 112 is an operation member (excluding a release button 111) for inputting a variety of operation instructions by a user, and is comprised of switches, buttons, and dials, more particularly, a power switch, a menu button, a direction instruction button, and so forth. The operation unit 112 includes a touch panel integrally formed with the display unit 109. The storage medium 119 is, for example, a memory card which is removably inserted into the image capturing apparatus 100 or integrated in the image capturing apparatus 100, for storing image data of photographed images (still images and moving images).

The detection unit 113 detects a specific object from a captured image (image output from the image sensor 103 and subjected to predetermined development processing by the image processor 106). The photometry unit 114 makes a setting of a photometry frame (photometry area) within an image capturing screen, and performs photometry calculation using a captured image. The ranging unit 115 performs ranging calculating using the capture image. Note that the detection unit 113, the photometry unit 114, and the ranging unit 115 can be provided integrally with the system controller 101 (or the image processor 106).

In the lens barrel 150, the lens group 152 is comprised of a plurality of lenses, including an optical shift lens, a zoom lens, and a focus lens. The diaphragm 153 adjusts the amount of flux transmitted through the lens group 152. In a state in which the lens barrel 150 is attached to the image capturing apparatus 100, the lens controller 151 and the system controller 101 are capable of performing bidirectional communication via an interface. The lens controller

151 transmits information concerning the components and functions of the lens barrel 150 to the system controller 101. Further, the lens controller 151 performs centralized control of the operations of the lens barrel 150 according to instructions from the system controller 101, and notifies a result of control to the system controller 101. More specifically, the lens controller 151 includes actuators for actuating the lens group 152 and the diaphragm 153, and controls the lens group 152 and the diaphragm 153 according to instructions from the system controller 101.

Figure 2:
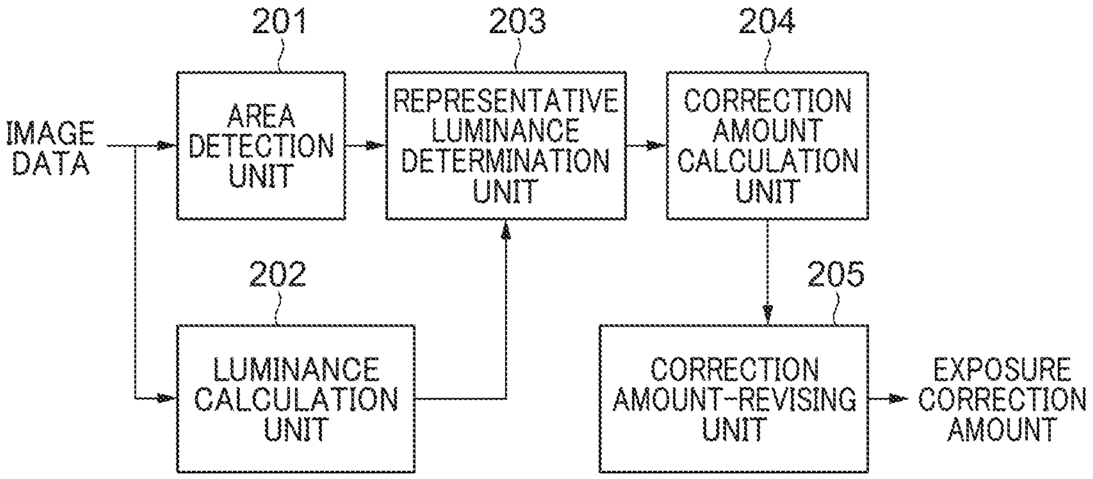
FIG. 2 is a block diagram showing a functional configuration for exposure correction performed by an image capturing apparatus.

Next, a description will be given of functional blocks of the image capturing system 10 for performing exposure correction at the time of image capturing. FIG. 2 is a block diagram showing a functional configuration for performing exposure correction at the time of image capturing. The functional configuration for performing exposure correction at the time of image capturing is comprised of an area detection unit 201, a luminance calculation unit 202, a representative luminance determination unit 203, a correction amount calculation unit 204, and a correction amount-revising unit 205. The functions of the luminance calculation unit 202, the representative luminance determination unit 203, the correction amount calculation unit 204, and the correction amount-revising unit 205 are executed by the photometry unit 114, and the function of the area detection unit 201 is executed by the detection unit 113.

Input to the area detection unit 201 and the luminance calculation unit 202 is image data output from the A/D converter 105 and subjected to the predetermined development processing by the image processor 106. The image data input to the area detection unit 201 and the luminance calculation unit 202 specifically includes image data of a frame image acquired when executing live view (before final photographing of a still image or a live image), and image data of an image captured by half-pressing of the release button 111.

The area detection unit 201 detects a predetermined area from image data input thereto. In the present embodiment, it is assumed that at least a face area and a skin area of a human is detected using a neural network. The face area refers to a whole face including hair, whisker, and the like, in other words, a part recognized when the head of a human is viewed from the front. The skin area refers to part where the skin is exposed, and is not limited to the face. To detect the face area and the skin area, a suitable known method can be employed. Further, the area detection unit 201 can be formed by a detector for a face area of a human and a detector for a skin area of the same.

Learning of the neural network for detecting a face area and a skin area is performed by inputting an image on which annotations are made by setting a face area and a skin area as correct-answer areas, respectively. To improve accuracy of detection of the face area and the skin area, it is preferable that the learning of the neural network is performed using images obtained from a variety of photographing scenes and images formed by capturing images of persons of various races.

The area detection unit 201 determines a skin determination score representing the likelihood (probability) of being skin for each block (area of a plurality of pixels formed by dividing an imaging surface into fixed sizes), based on a result of reasoning by a neural network having learned skin areas. As the skin determination score, numerical values (0 to 255) of eight bits, for example, can be used. As the skin determination score is larger, the likelihood of the skin area is higher. In the present embodiment, areas each having a skin determination score higher than a predetermined value (e.g. 128) are detected as skin areas, and dimensions indicating a square representing each detected skin area are output.

The luminance calculation unit 202 determines luminance information of image data input thereto for each block formed by a predetermined number of pixels, and further calculates an average value of luminance values of the whole image (average luminance value). It is assumed that each block has at least one R pixel, one G1 pixel, one G2 pixel, and one B pixel. The luminance of each block is determined as follows: An output of an R pixel is multiplied by one and by a white balance (WB) coefficient for R pixels to calculate a luminance value of the R pixel. An output of a G1 pixel is multiplied by three and by a WB coefficient for G1 pixels to calculate a luminance value of the G1 pixel. A luminance value of a G2 pixel is calculated similarly to the luminance value of the G1 pixel. An output of a B pixel is multiplied by one and by a WB coefficient for B pixels to calculate a luminance value of the B pixel. The respective luminance values of the R pixel, the G1 pixel, the G2 pixel, and the B pixel are added up to calculate a luminance value of the block.

The representative luminance determination unit 203 determines the representative luminance values of the light portions and the dark portions of a within-face skin area, based on the face area and the skin area detected by the area detection unit 201 and the luminance values calculated by the luminance calculation unit 202. The within-face skin area is a skin area within the face area, and refers to an area formed by excluding areas of hair, whisker, eyes, lips, and so forth other than skin, from the face area. A method of determining a representative luminance value will be described in detail hereinafter.

The correction amount calculation unit 204 calculates an exposure correction amount at the time of image capturing, based on the representative luminance values of the light portions and the dark portions of the within-face skin area, which are determined by the representative luminance determination unit-203. A method of calculating the exposure correction amount will be described in detail hereinafter.

The correction amount-revising unit 205 calculates a final exposure correction amount, by using the exposure correction amount calculated by the correction amount calculation unit 204, the average luminance values calculated by the luminance calculation unit 202, and an exposure correction amount set by a known method. A method of revising the exposure correction amount will be described in detail hereinafter.

Figure 3:
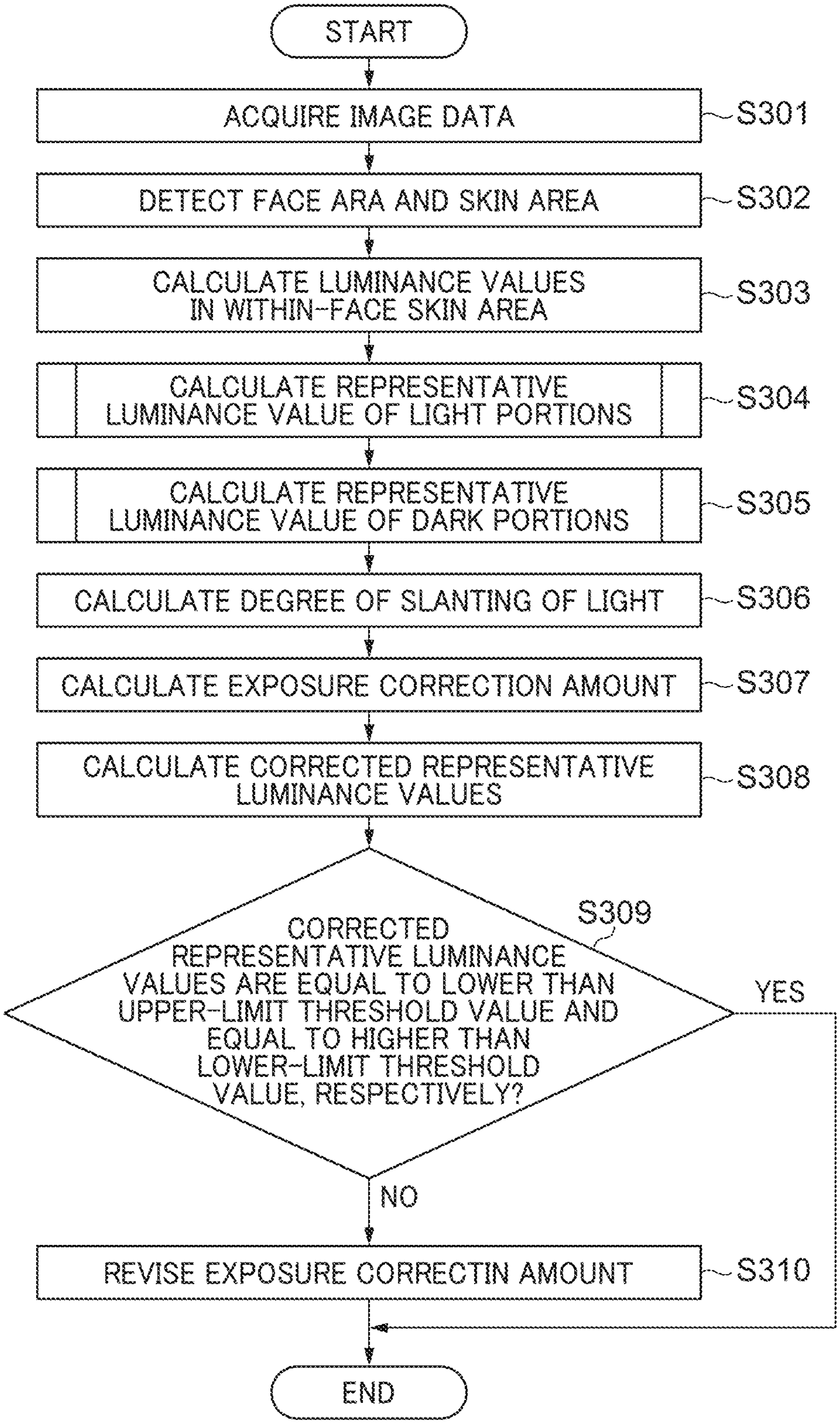
FIG. 3 is a flowchart of an exposure correction process according to a first embodiment.

FIG. 3 is a flowchart of an exposure correction process performed by the image capturing system 10 according to a first embodiment. Processing operations (steps) indicated by S number in the flowchart are realized by the system controller 101 executing a predetermined program to perform centralized control of operations of associated units of the image capturing system 10.

In a step S301, the system controller 101 acquires image data to be input to the area detection unit 201 and the luminance calculation unit 202 from the image processor 106, and transmits the image data to the area detection unit 201 and the luminance calculation unit 202. The image data acquired from the image processor 106 is image data which is output from the A/D converter 105 to the image processor 106, and is generated by performing predetermined development processing by the image processor 106, i.e. data of an image acquired before final photographing.

Figure 4A:
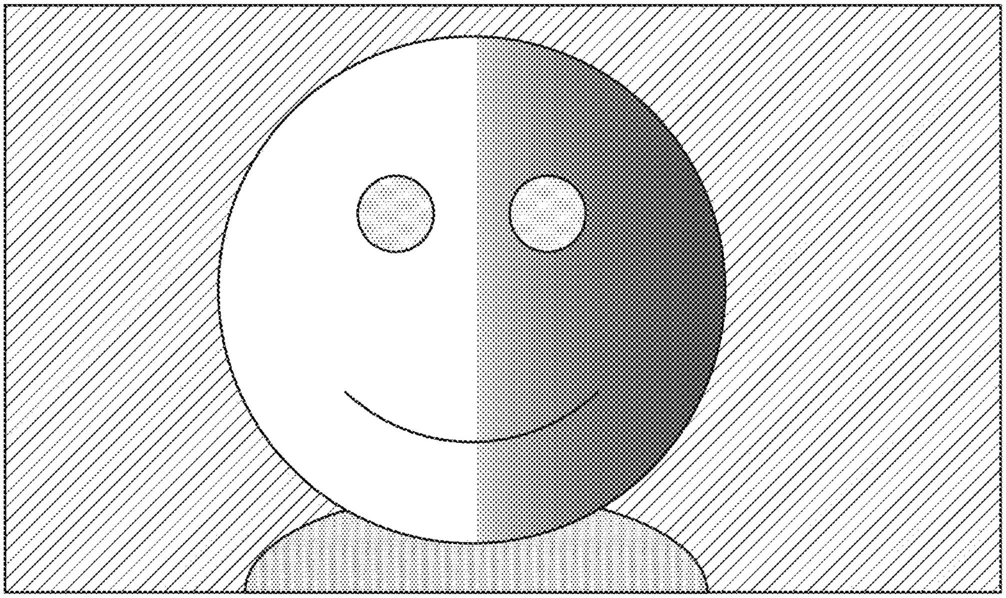
FIGS. 4A and 4B are diagrams showing an image of image data acquired in a step in FIG. 3, and an image on which a detected face area and a detected skin area are expressed, in a simplified manner.
Figure 4B:
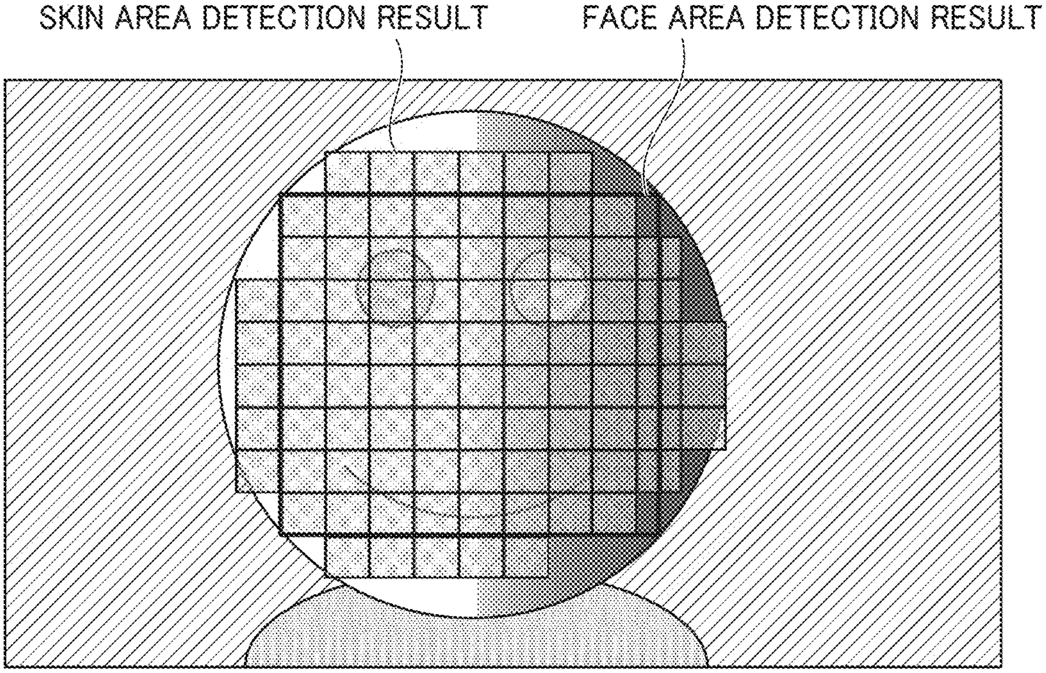

In a step S302, the area detection unit 201 detects a face area and a skin area, from the acquired image data. As described above, the face area detection unit 201 detects a face area and a skin area for each block. FIG. 4A is a diagram showing an image based on the image data acquired in the step S301, in a simplified manner. FIG. 4B is a diagram useful for explaining the face area and the skin area detected in the step S302, in the image in FIG. 4A. Approximately right half of a face in FIG. 4B is a light area on which light is incident, and approximately left half of the face is a dark area on which light is not incident.

In a step S303, the luminance calculation unit 202 calculates luminance values in a within-face skin area for each predetermined block, based on the face area and the skin area detected in the step S302.

In a step S304, the representative luminance determination unit 203 determines a representative luminance value of light portions from the luminance values in the within-face skin area determined in the step S303. Now, the method of determining the representative luminance value of the light portions will be described.

Figure 5:
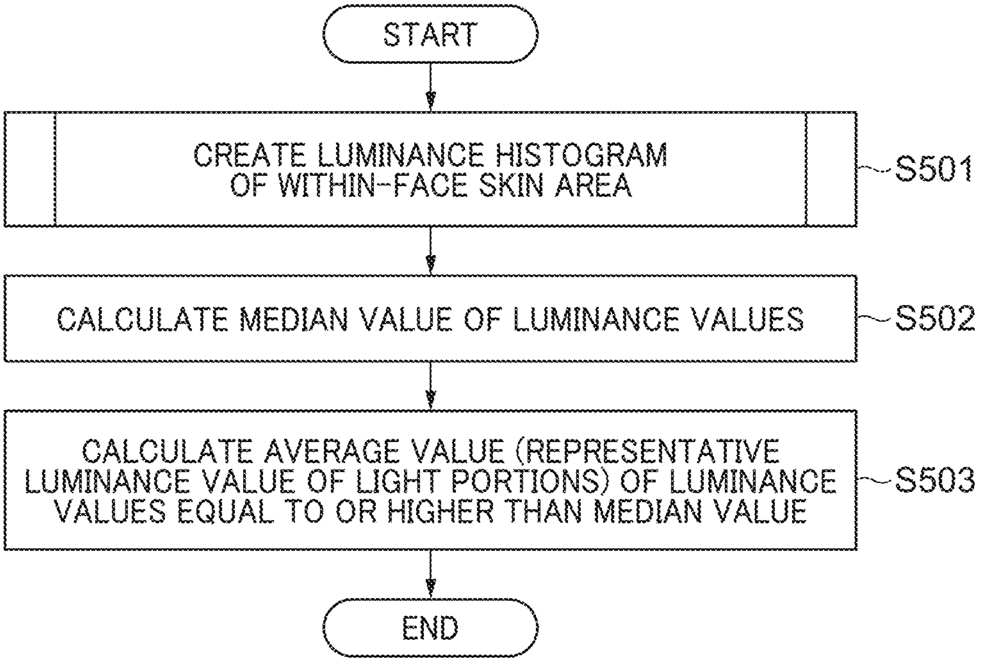
FIG. 5 is a flowchart of a process in a step in FIG. 3.

FIG. 5 is a flowchart of a process performed in the step S304. This process can be performed for each of pixels forming an image, or for each of blocks forming the image.

In a step S501, the representative luminance determination unit 203 creates a luminance histogram of the within-face skin area determined in the step S303. In doing this, as the number of bins in the histogram is larger, the accuracy is higher, but there arises a problem that a larger memory area is required for calculation and it takes longer time to perform processing. In view of this, in the present embodiment, bins are properly assigned accordingly so as to ensure increased accuracy even with a smaller number of bins, and how to assign the bins will be described. Note that the representative luminance determination unit 203 includes a first determination section that determines a range of luminance values when creating a luminance histogram, a second determination unit that determines a range of each of sections of luminance values, and a third determination unit that determines the number of bins in each section in the histogram.

Figure 6:
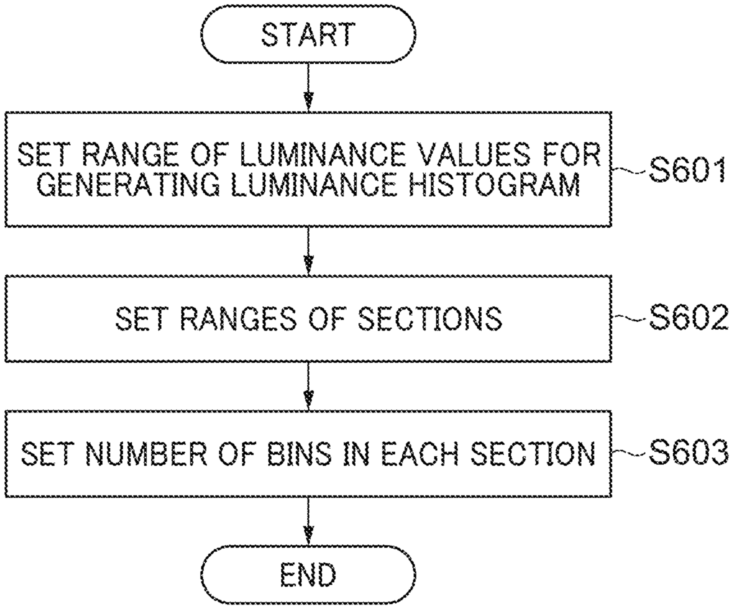
FIG. 6 is a flowchart of a process in a step in FIG. 5.
Figure 7:
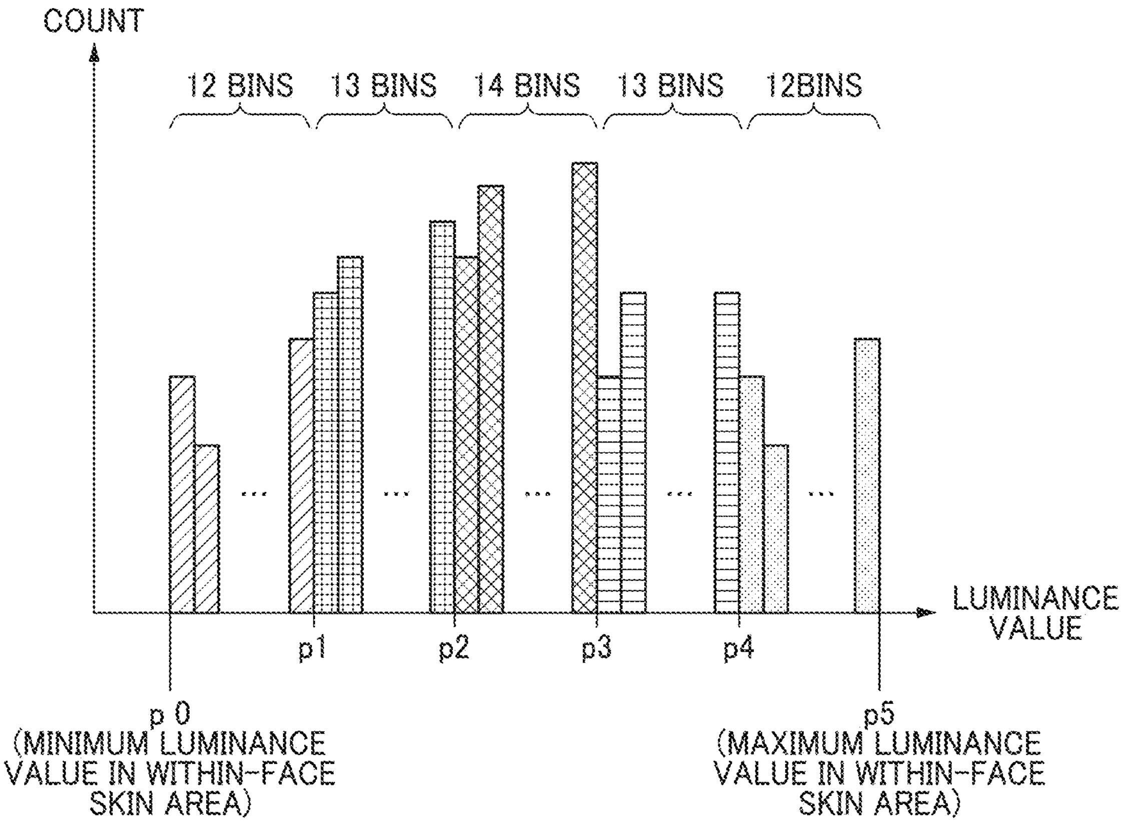
FIG. 7 is a schematic diagram showing a luminance histogram generated in a step in FIG. 5.

FIG. 6 is a flowchart of a process performed in the step S501. FIG. 7 is a schematic diagram of a luminance histogram generated in the step S501. In a step S601, the first determination section sets a range between the minimum value and the maximum value of luminance values in the within-face skin area calculated in the step S303, as a range of luminance values for generating a histogram. In FIG. 7, the minimum value of luminance values in the within-face skin area is represented by p0, and the maximum value of the same is represented by p5.

In a step S602, the second determination unit sets a plurality of equal sections within a range set in the step S601. For example, when setting five sections, there are set p0 to p1, p1 to p2, p2 to p3, p3 to p4, p4 to p5.

In a step S603, the third determination unit sets the number of bins in the whole luminance histogram, such that the number of bins in central portions in the range set in the step S601 becomes larger, followed by terminating the present process. By increasing the resolution of bins at portions approximately corresponding to a median value, it is possible to increase the calculation accuracy of the median value, which makes it possible to increase the calculation accuracy of a degree of slanting of light. For example, when the upper limit of the number of bins is 64, the number bins of in each section can be determined as illustrated in FIG. 7.

Description returns to the flowchart in FIG. 5. In a step S502, the representative luminance determination unit 203 calculates the median value of the luminance values (hereafter referred to "the luminance median value") from the luminance histogram generated in the step S501.

In a step S503, the representative luminance determination unit 203 calculates, out of luminance values in the within-face skin area calculated in the step S303, an average value of luminance values equal to or higher than the luminance median value calculated in the step S502, as a representative luminance value of light portions, followed by terminating the present process to execute processing in a step S305.

In the step S305, the representative luminance determination unit 203 calculates, out of luminance values in the within-face skin area calculated in the step S303, an average value of luminance values lower than the luminance median value calculated in the step S502, as a representative luminance value of dark portions.

In a step S306, the correction amount calculation unit 204 calculates a degree of slanting of light, from a difference ΔSkin between the representative luminance value of the light portions determined in the step S304 and the representative luminance value of the dark portions determined in the step S305.

Figure 8:
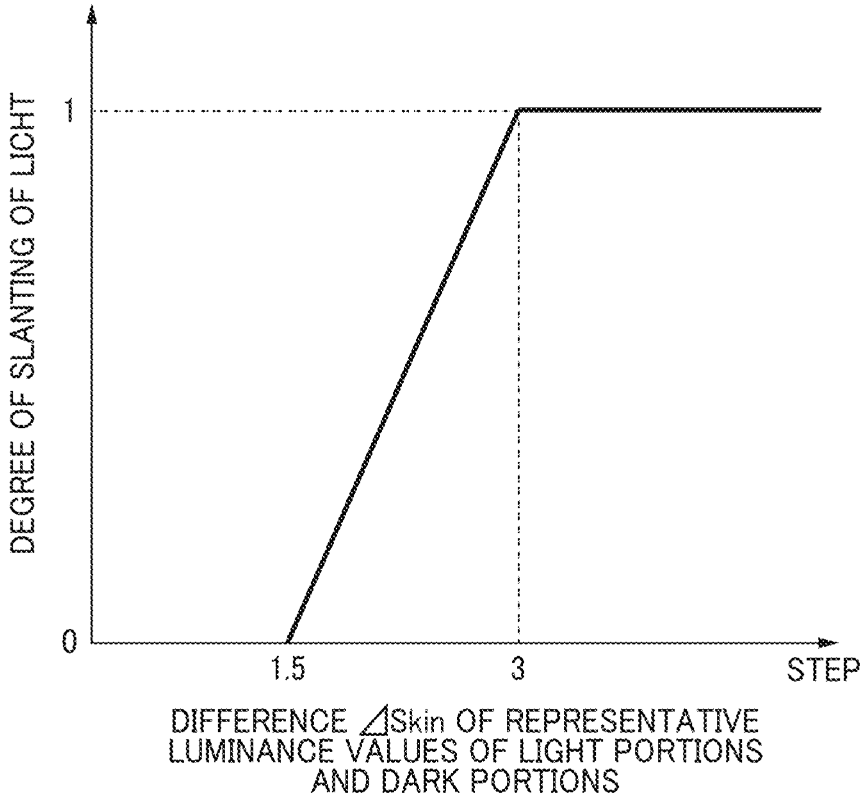
FIG. 8 is a diagram showing a relationship between a difference between representative luminance values of light portions and dark portions, and a degree of slanting of light.

FIG. 8 is a diagram showing a relationship between the difference ΔSkin and the degree of slanting of light. In the present embodiment, it is assumed that the degree of slanting of light is equal to or larger than 0 and equal to or smaller than 1. In a case where the difference ΔSkin is equal to or smaller than 1.5 steps (first value), the degree of slanting of light is determined as "0", and in a case where the difference ΔSkin is equal to or larger than 3 steps (second value), the degree of slanting of light is determined as "1" which is the maximum value. In a case where the difference ΔSkin is larger than 1.5 steps and smaller than 3 steps, the degree of slanting of light is determined by linear interpolation between 1.5 steps and 3 steps. Note that the method of determining the degree of slanting of light is not limited to the method described above, but, for example, by calculating a dispersion of luminance values in the within-face skin area, the degree of slanting of light can be determined as a larger value as the dispersion is larger.

In a step S307, the correction amount calculation unit 204 calculates an exposure correction amount based on the face area detected in the step S302 and the degree of slanting of light calculated in the step S306, by the following equation (1):

$$\text{exposure correction amount} = \text{degree of slanting} \times \frac{2}{3} \times \alpha \tag{1}$$

Figure 9:
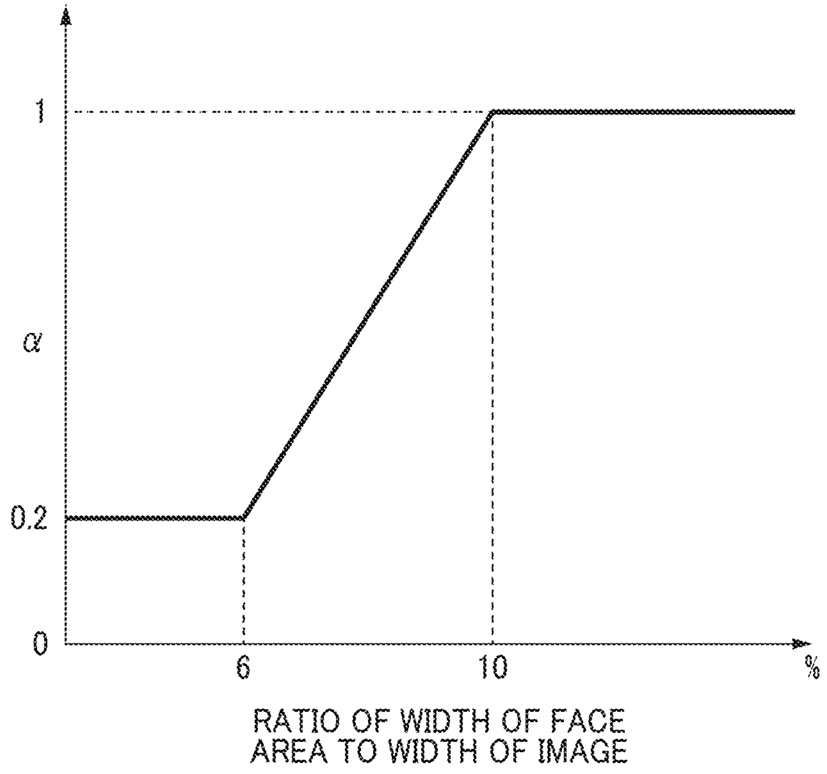
FIG. 9 is a diagram showing a relationship between a correction coefficient and a ratio between a width of image data and a width of a face area.

Portion "⅔" in the equation (1) means that exposure is made brighter by ⅔ steps. In the equation (1), a represents a correction coefficient corresponding to a size of the face area detected in the step S302. FIG. 9 is a diagram showing a relationship between the correction coefficient α and a ratio of the width of the face area to the width of the image data. In the present embodiment, the correction coefficient α is set to 0.2 in a case where the ratio of the width of the face area to the width of the image data is 6% or lower, to 1 in a case where the same is 10% or higher, and to a value calculated by linear interpolation in a case where the same is higher than 6% and lower than 10%. By performing such exposure correction, it is possible, in a case where a person appears large in a captured image, to make proper the amount of exposure to the person, and on the other hand, in a case where a person appears small in a captured image, to make proper the amount of exposure to the entire captured image including the background.

In a step S308, the correction amount calculation unit 204 calculates respective corrected representative luminance values of light portions and dark portions (hereafter referred to as "the corrected representative luminance value of light portions, and the corrected representative luminance value of dark portions) which are calculated using the exposure correction amount calculated in the step S307.

In a step S309, the correction amount calculation unit 204 determines whether a first condition that the corrected representative luminance value of light portions calculated in the step S308 is equal to or higher than an upper-limit threshold value (first threshold value) and a second condition that the corrected representative luminance value of dark portions is equal to or lower than a lower-limit threshold value (second threshold value) are both satisfied. If the correction amount calculation unit 204 determines that the first and second conditions are both satisfied (YES in S309), the correction amount calculation unit 204 outputs the exposure correction amount calculated in the step S308 to the system controller 101 via the correction amount-revising unit 205, and then the system controller 101 terminates the present process. In other words, in a case where the determination in the step S309 is affirmative (YES), the correction amount-revising unit 205 does not perform any processing on the exposure correction amount. Therefore, in a case where the determination in the step S309 is affirmative (YES), the image capturing apparatus 100 can be configured such that the exposure correction amount can be directly transmitted to the system controller 101. On the other hand, if the correction amount calculation unit 204 determines that at least one of the first and second conditions is not satisfied (NO in S309), the system controller 101 proceeds to a step S310.

In the step S310, the correction amount-revising unit 205 calculates a final exposure correction amount by correcting the exposure correction amount calculated in the step S308, and then the system controller 101 terminates the present process.

Figure 10:
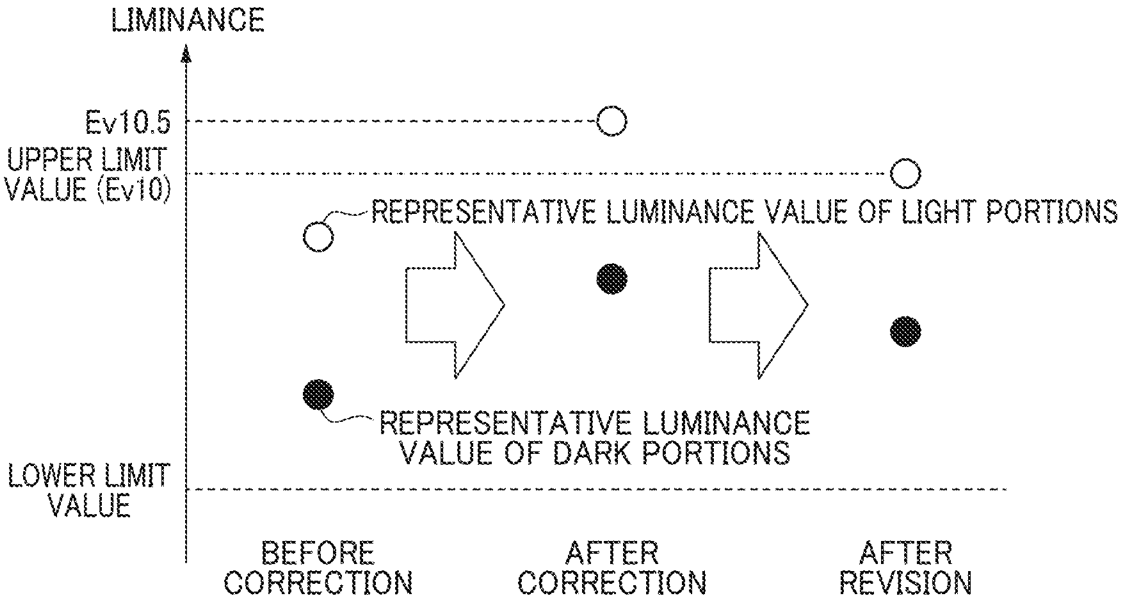
FIG. 10 is a schematic diagram useful in explaining effects of exposure correction by the exposure correction process in FIG. 3.

FIG. 10 is a schematic diagram useful in explaining effects of exposure correction by the exposure correction process in FIG. 3. In FIG. 10, as a result of application of the exposure correction amount (⅔ steps) calculated in the step S307, the corrected representative luminance value of light portions is equal to an Ev value of 10.5, which exceeds the upper-limit threshold Ev value of 10, and on the other hand, the corrected representative luminance value of dark portions is higher than the lower-limit threshold value. Accordingly, the correction-revising unit 205 corrects the exposure correction amount to ⅙ steps. As a result, while causing the corrected representative luminance value of dark portions to remain equal to or higher than the lower-limit threshold value, the corrected representative luminance value of light portions is corrected to the higher limit threshold value. Thus, it is possible to prevent the image from becoming too light or becoming too dark.

As described above, according to the first embodiment, after determining the exposure correction amount by using the degree of slanting of light, the exposure correction amount is revised such that light portions are prevented from becoming too light and dark portions are prevented from becoming too dark, as required. Final photographing is performed by using the exposure correction amount thus finally determined, it is possible to capture an image balanced in light portions and dark portions, in other words, an image in which light portions are not too light and dark portions are not too dark.

In a case where the difference between the representative luminance value of light portions calculated in the step S304 and the representative luminance value of dark portions calculated in the step S305 is large, the correction and revising of the amount of exposure according to the first embodiment cannot make these representative luminance values falling between the upper-limit threshold value and the lower-limit threshold value. In a second embodiment, the correction and revising of the exposure amount performed in such a case will be described.

Figure 11:
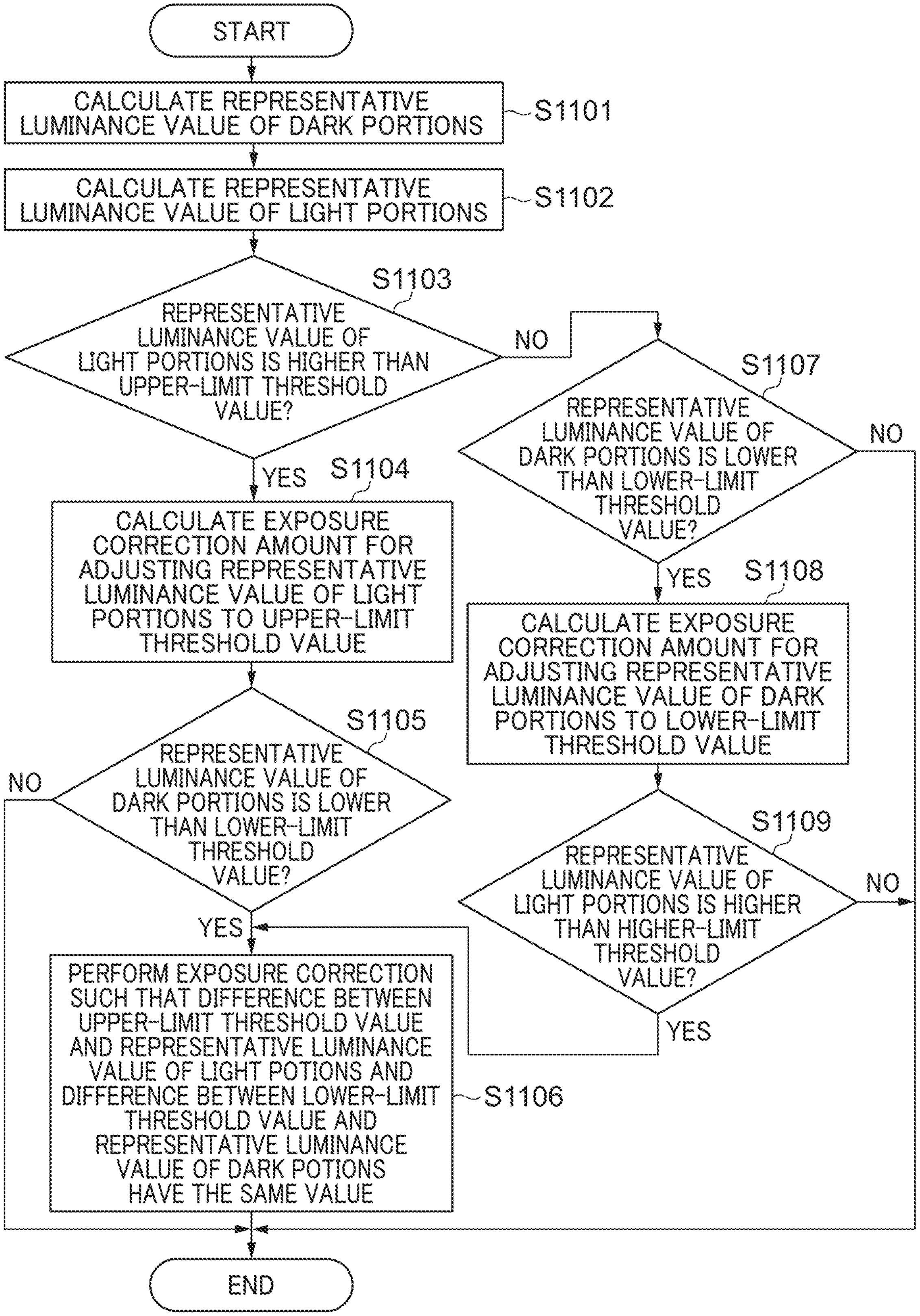
FIG. 11 is a flowchart of an exposure correction process according to a second embodiment.

FIG. 11 is a flowchart of an exposure correction process performed by the image capturing system 10 according to the second embodiment. Processing operations (steps) indicated by S number in the flowchart are realized by the system controller 101 executing a predetermined program to perform centralized control of operations of associated units of the image capturing system 10.

In a step S1101, the representative luminance determination unit 203 determines the representative luminance value of light portions from luminance values in the within-face skin area. In a step S1102, the representative luminance determination unit 203 determines the representative luminance value of dark portions from luminance values in the within-face skin area. The processing operations in the steps S1101 and S1102 can be executed similar to the steps S304 and S305. Therefore, at the time point of termination of the step S1102, it can be regarded that processing of steps S301 to S305 has been performed. Note that the processing operations of the steps S1101 and S1102 can be differently performed from the processing operations of the steps S304 and S305.

In a step S1103, the correction amount calculation unit 204 determines whether or not the representative luminance value of light portions is higher than the upper-limit threshold value. If the correction amount calculation unit 204 determines that the representative luminance value of light portions is higher than the upper-limit threshold value (YES in S1103), the system controller 101 proceeds to a step S1104.

In the step S1104, the correction amount-revising unit 205 calculates an exposure correction amount for adjusting the representative luminance value of light portions to the upper-limit threshold value, by using an average luminance value or a known method.

In a step S1105, the correction amount-revising unit 205 determines whether or not the corrected representative luminance value of dark portions corrected using the exposure correction amount calculated in the step S1104 is lower than the lower-limit threshold value. If the correction amount-revising unit 205 determines that the corrected representative luminance value of dark portions is lower than the lower-limit threshold value (YES in S1105), a step S1106 is performed. On the other hand, if the correction amount-revising unit 205 determines that the corrected representative luminance value of dark portions is equal to or higher than the lower-limit threshold value (NO in S1105), the system controller 101 terminates the present process.

In the step S1106, the correction amount-revising unit 205 revises the exposure correction amount such that the difference between the representative luminance value of light portions and the upper-limit threshold value and the difference between the representative luminance value of dark portions and the lower-limit threshold value have the same value, and then the system controller 101 terminates the present process.

If the correction amount calculation unit 204 determines in the step S1103 that that the representative luminance value of light portions is equal to or lower than the upper-limit threshold value (NO in S1103), the system controller 101 proceeds to a step S1107.

In the step S1107, the correction amount calculation unit 204 determines whether or not the representative luminance value of dark portions is lower than the lower-limit threshold value. If the correction amount calculation unit 204 determines that the representative luminance value of dark portions is equal to or higher than the lower-limit threshold value (NO in S1107), the system controller 101 terminates the present process. Note that in a case where the determination in the step S1107 is negative (NO) to terminate the present process, the process proceeds, thereafter, to the step S306 in the exposure correction process in FIG. 3, described in the first embodiment, wherein the exposure correction based on the degree of slanting of light can be performed, and hence it is preferable that the exposure correction based on the degree of slanting of light is performed. On the other hand, if the correction amount calculation unit 204 determines that the representative luminance value of dark portions is lower than the lower-limit threshold value (YES in S1107), the system controller 101 proceeds to a step S1108.

In the step S1108, the correction amount-revising unit 205 calculates an exposure correction amount for adjusting the representative luminance value of dark portions to the lower-limit threshold value, by using an average luminance value or a known method.

In a step S1109, the correction amount-revising unit 205 determines whether or not the corrected representative luminance value of light portions corrected using the exposure correction amount calculated in the step S1108 is higher than the upper-limit threshold value. If the correction amount-revising unit 205 determines that the corrected representative luminance value of light portions is equal to or lower than the upper-limit threshold value (NO in S1109), the system controller 101 terminates the present process. Note that in a case where the determination in the step S1109 is negative (NO) to terminate the present process, the process further proceeds, thereafter, to the step S306 in the exposure correction process in FIG. 3, described in the first embodiment, wherein the exposure correction based on the degree of slanting of light can be performed, and hence it is preferable that the exposure correction based on the degree of slanting of light is performed. On the other hand, if the correction amount-revising unit 205 determines that the corrected representative luminance value of light portions is larger than the upper-limit threshold value (YES in S1109), the system controller 101 proceeds to the step S1106, followed by terminating the present process.

Figure 12:
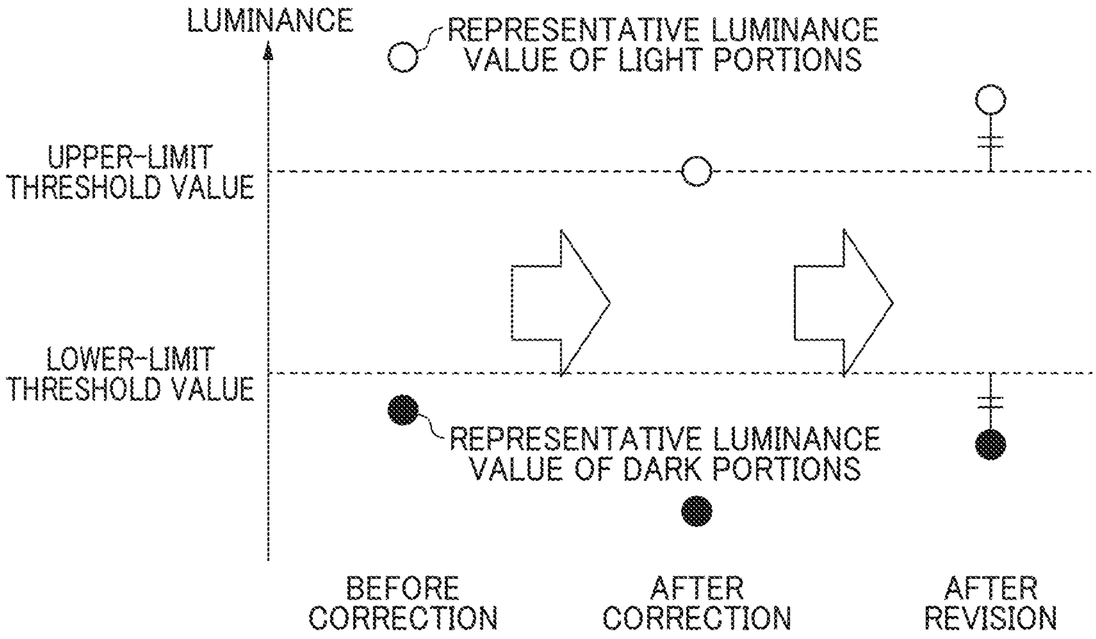
FIG. 12 is a schematic diagram showing effects of the exposure correction process in in FIG. 11.

FIG. 12 is a schematic diagrams showing changes in the representative luminance values in a case where the processing through the steps S1103 to S1106 is performed, by exemplifying a case where the representative luminance value of light portions is higher than the upper limit value and at the same time, the representative luminance value of dark portions is lower than the lower limit value. When the determination in the step S1103 is affirmative (YES), the exposure correction amount for adjusting the representative luminance value of light portions to the upper threshold value as illustrated by “after correction” in FIG. 12, is calculated in the step S1104. As a result, the corrected representative luminance value of dark portions becomes a low value largely remote from the lower-limit threshold value, so that the determination in the step S1105 becomes affirmative (YES) to execute the step S1106, whereby the exposure correction amount is revised such that representative luminance value of light portions and representative luminance value of dark portions result, as denoted by “after revision” in FIG. 12. Processing through the step S1103, S1107 to S1109, and S1106, as well, similar results are obtained at “after revision”.

As described above, according to the second embodiment, in a case where the difference in luminance value between light portions and dark portions is large, final photographing can be performed by using an exposure correction amount in which balance in light portions and dark portions is taken into consideration. This makes it possible to obtain an image balanced between light portions and dark portions, in other words, an image in which light portions are not too light and dark portions are not too dark.

Next, a third embodiment will be described. In the third embodiment, a description is given of an example of processing in which gradation correction is performed on image data such that the representative luminance value of light portions is equal to or lower than the upper-limit threshold value and at the same time the representative luminance value of dark portions is equal to or higher than the lower-limit threshold value.

Figure 13:
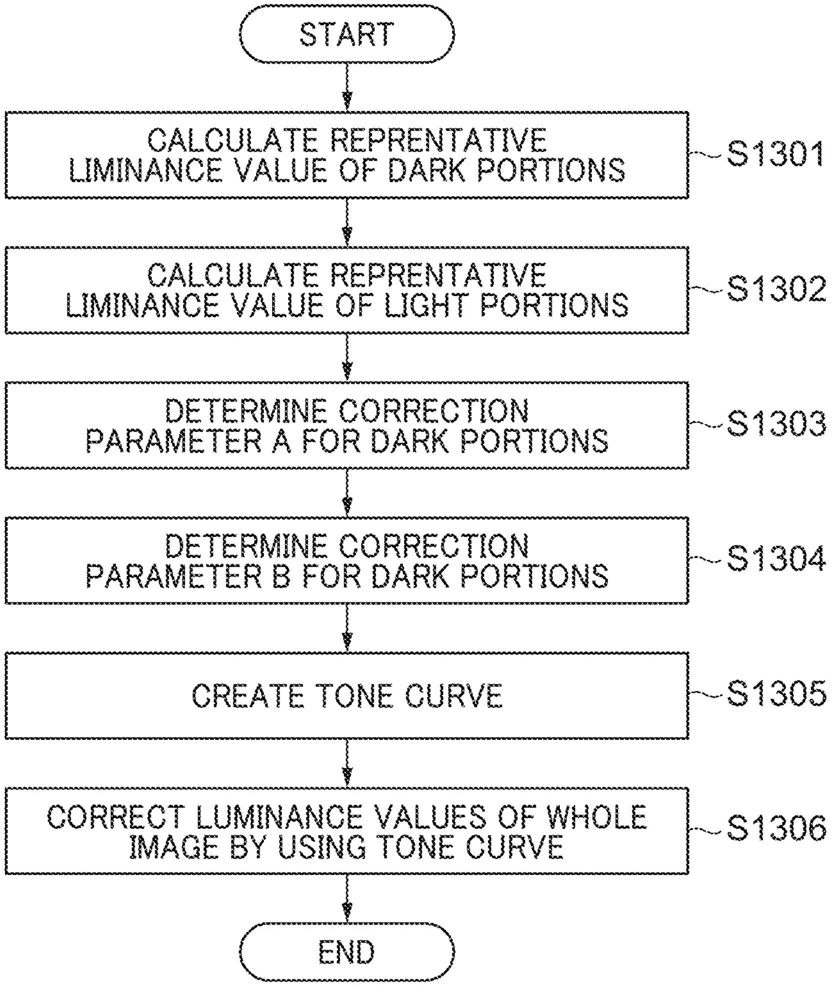
FIG. 13 is a flowchart of a gradation correction process according to a third embodiment.

FIG. 13 is a flowchart of a gradation correction process performed by the image capturing system 10 according to the third embodiment. Processing operations (steps) indicated by S number in the flowchart are realized by the system controller 101 executing a predetermined program to perform centralized control of operations of associated units of the image capturing system 10. Different from the first and second embodiments in which image data before final photographing is processed, the third embodiment is applied to image data of an image captured by an amount of exposure corrected or revised by a known exposure correction method or exposure correction methods described in the first and second embodiments. Therefore, the processing steps in the gradation correction process in FIG. 13 is performed by the image processor 106.

In a step S1301, the image processor 106 determines a representative luminance value of light portions from luminance values in a within-face skin area. In a step S1302, the image processor 106 determines a representative luminance value of dark portions from luminance values in the within-face skin area. The processing operations in the steps S1301 and S1302 can be executed similar to the steps S304 and S305. Therefore, at the time point of termination of the step S1302, it can be regarded that equivalent processing to the processing of steps S301 to S305 has been performed. Note that the processing operations of the steps S1301 and S1302 can be differently performed from the processing operations of the steps S304 and S305.

Figure 14A:
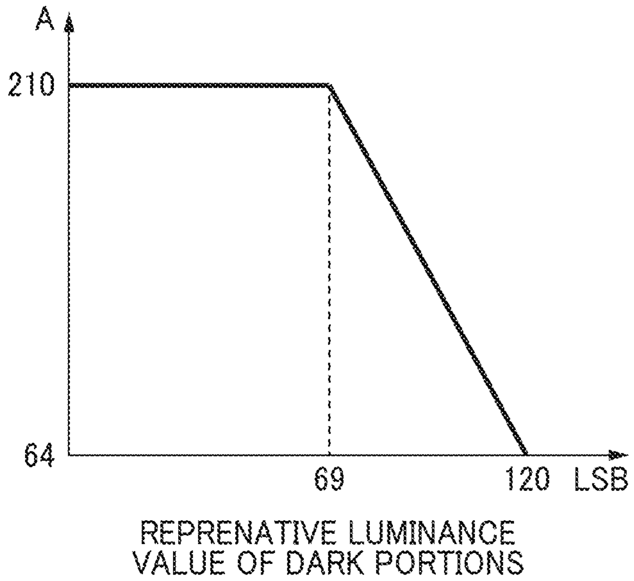
FIGS. 14A to 14C are diagrams showing respective relationships between a representative luminance value and a correction parameter, and a diagram showing a tone curve for performing graduation correction.

In a step S1303, the image processor 106 determines a correction parameter A for dark portions. FIG. 14A is a graph showing a relationship between the representative luminance value of dark portions and the correction parameter A, and the data of the graph is stored in a memory included in the image processor 106 or the system controller 101.

The image processor 106 determines a value of the correction parameter A corresponding to the representative luminance value of dark portions calculated in the step S1301, based on the graph in FIG. 14A. Note that, similar to the first embodiment, by determining a degree of slanting of light, the correction parameter A of dark portions can be reduced according to the determined degree of slanting of light. This is for executing the gradation correction in the present embodiment only for a slanting light scene.

Figure 14B:
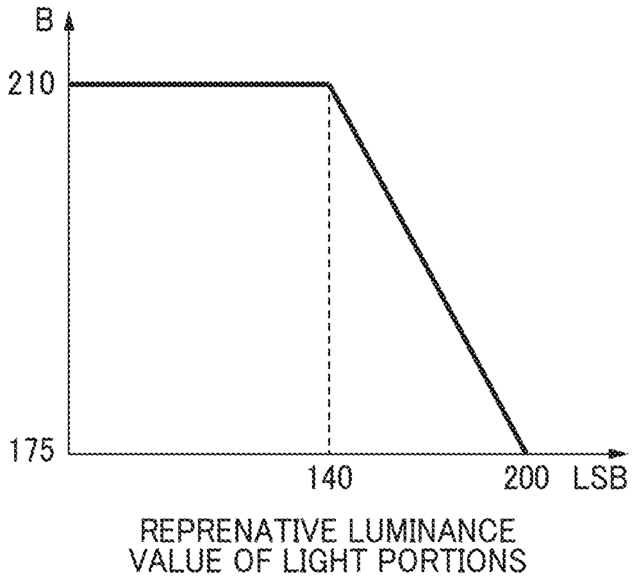

In a step S1304, the image processor 106 determines a correction parameter B for light portions. FIG. 14B is a graph showing a relationship between the representative luminance value of light portions and the correction parameter B, and the data of the graph is stored in the memory included in the image processor 106 or the system controller 101. The image processor 106 determines a value of the correction parameter B corresponding to the representative luminance value of light portions calculated in the step S1302, based on the graph in FIG. 14B.

Figure 14C:
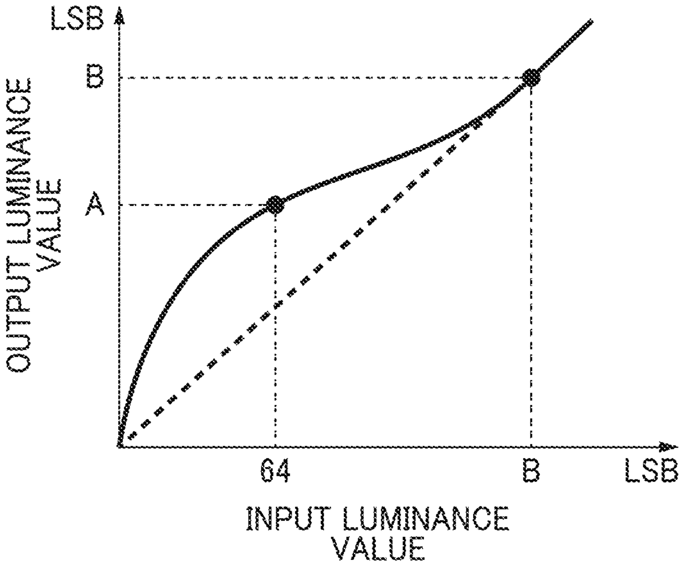

In a step S1305, the image processor 106 generates data for performing gradation correction based on the correction parameter A for dark portions determined in the step S1303 and the correction parameter B for light portions determined in the step S1304. FIG. 14C is a diagram showing an example of a tone curve as an example of gradation correction data generate in the step S1305. Here, an example is illustrated in which for a dark side, an input luminance value of 64 (LSB) is elevated to an output luminance value of A (>64) (LSB) to make the dark side brighter, and for a light side, the input luminance value and the output luminance value are made equal to a luminance value of B (LSB). The gradation correction data can be generated as a table showing a relationship between the input luminance value and the output luminance value.

In a step S1306, the image processor 106 corrects luminance values of the whole image by using the gradation correction data (tone curve) generated in the step S1305, and image data subjected to gradation correction is output to the memory controller 107, followed by terminating the present process.

Figure 15:
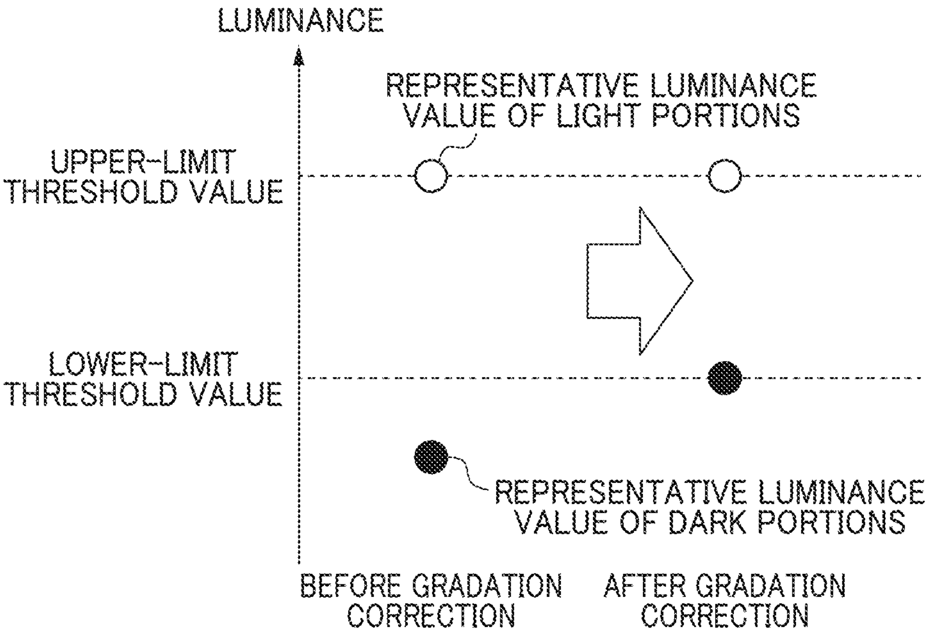
FIG. 15 is a schematic diagram useful in explaining effects of exposure correction by the graduation correction process in FIG. 13.

FIG. 15 is a schematic diagram useful in explaining effects of gradation correction by the graduation correction process in FIG. 13. In an image before gradation correction in FIG. 15, the representative luminance value of light portions is equal to the upper-limit threshold value, and the representative luminance value of dark portions is lower than the lower limit threshold value. In this case, gradation correction data similar to the tone curve in FIG. 14C is generated, such that the representative luminance value of light portions is held, and at the same time the representative luminance value of dark portions becomes equal to the lower-limit threshold value. Thus, according to the third embodiment, by suppressing generation of blackouts and white outs, it is possible to capture an image balanced between light portions and dark portions.

The gradation correction in the third embodiment can be applied to image data “after correction” in the example in FIG. 10 in the first embodiment, and to image data “before correction”, “after correction” and “after revision” in the example in FIG. 12 in the second embodiment. Specifically, in “after correction” in the example in FIG. 10, the corrected representative luminance value of light portions is larger than the upper-limit threshold value, and hence gradation correction data is generated such that the representative luminance value of light portions becomes equal to the upper-limit threshold value, thereby performing the gradation correction. In doing this, the representative luminance value of dark portions can be held at a value after correction, or can be revised to become substantially equal to value “after revision” in FIG. 10.

The state “after correction” in the example in FIG. 12 is equivalent to the state in the example in FIG. 15, and hence it is only required to perform the same gradation correction as performed in the example in FIG. 15. As to “before correction” and “after correction” in the example in FIG. 12, it is only required to generate gradation correction data such that the representative luminance value of light portions becomes equal to the upper-limit threshold value, and at the sane time, the representative luminance value of dark portions is equal to the lower-limit threshold value, thereby performing gradation correction.

Although the present disclosure has been described heretofore based on the preferred embodiments, the present disclosure is not limited to these specific embodiments but also includes a variety of forms embodied without departing from the scope of the disclosure. Further, the described embodiments are to be considered in all respects only as illustrative and not restrictive, and can be combined on an as-needed basis.

For example, the above embodiments are described by taking an example of the image capturing system 10 comprised of the image capturing apparatus 100 (digital camera) and the lens barrel 150 (exchangeable lens), but the present disclosure can be applied also to electronic devices capable of capturing images by an image sensor. Such electronic devices include digital video cameras, smartphones, tablet PCs, mobile phones with cameras, and so forth. Further, the image capturing apparatus 100 and the lens barrel 150 can be integrally formed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-049565 filed Mar. 26, 2024, which is hereby incorporated by reference herein in its entirety.

What is claimed is:

1. An image capturing apparatus comprising:

at least one processor or circuit configured to function as:

a first detection unit configured to detect a face area of a person, from an image captured by an image sensor;

a second detection unit configured to detect a skin area from the image;

a first calculation unit configured to calculate a representative luminance value of light portions and a representative luminance value of dark portions in a within-face skin area which is a skin area detected in the face area;

a first determination unit configured to determine a degree of slanting of light in the within-face skin area, based on the representative luminance value of the light portions and the representative luminance value of the dark portions; and a correction unit configured to calculate an exposure correction amount for correcting exposure at time of image capturing by the image sensor, based on the degree of slanting of light.

2. The image capturing apparatus according to claim 1, wherein the at least one processor or circuit is configured to further function as:

a determination unit configured to determine whether or not a first condition that a corrected value, by the exposure correction amount, of the representative luminance value of light portions, is equal to or lower than a first threshold value and a second condition that a corrected value, by the exposure correction amount, of the representative luminance value of dark portions, is equal to or higher than a second threshold value which is lower than the first threshold value, are satisfied; and a revision unit configured to revise the exposure correction amount based on a result of determination by the determination unit.

3. The image capturing apparatus according to claim 2, wherein the correction unit does not revise the exposure correction amount, in a case where the first condition is satisfied, and at the same time, the second condition is satisfied.

4. The image capturing apparatus according to claim 2, wherein in a case where the first condition is not satisfied, the correction unit revises the exposure correction amount such that the corrected value of the representative luminance value of the light portions becomes equal to the first threshold value.

5. The image capturing apparatus according to claim 4, wherein the revision unit revises the exposure correction amount, in a case where a difference between the corrected value, by the exposure correction amount, of the representative luminance value of the light portions, and the corrected value, by the exposure correction amount, of the representative luminance value of the dark portions, is equal to or smaller than a difference between the first threshold value and the second threshold value.

6. The image capturing apparatus according to claim 4, wherein the at least one processor or circuit is configured to further function as:

an image processing unit configured to perform image processing on an image captured by the image sensor, using the revised exposure amount by the revision unit, wherein the image processing unit comprises:

a second detection unit configured to detect a face area and a skin area of a person, from the image, a second calculation unit configured to calculate a representative luminance value of light portions and a representative luminance value of dark portions in a within-face skin area which is a skin area detected in the face area, a second determination unit configured to determine a correction parameter for the light portions based on the representative luminance value of the light portions, and determine a correction parameter for the dark portion based on the representative luminance value of the dark portions, a generation unit configured to generate data for performing gradation correction of luminance values of the image, based on the correction parameter for the light portions and the correction parameter for the dark portions, and a gradation correction unit configured to perform gradation correction of luminance values of the image, by using the data.

7. The image capturing apparatus according to claim 2, wherein in a case where neither the first condition nor the second condition is satisfied, the revision unit revises the exposure correction amount such that a difference between the corrected value of the representative luminance value of the light portions and the first threshold value and a difference between the corrected value of the representative luminance value of the dark portions and the second threshold value become equal to each other.

8. The image capturing apparatus according to claim 1, wherein the degree of slanting of light is determined based on a difference between the representative luminance value of the light portions and the representative luminance value of the dark portions.

9. The image capturing apparatus according to claim 8, wherein the degree of slanting of light is determined to be 0, in a case where the difference is equal to or smaller than a first predetermined value, to be 1, in a case where the difference is equal to or larger than a second predetermined value which is larger than the first predetermined value, and to be a value calculated by linear interpolation between the first value and the second value, in a case where the difference is larger than the first predetermined value and smaller than the second predetermined value.

10. The image capturing apparatus according to claim 1, wherein the degree of slanting of light takes a value equal to or larger than 0 and equal to or smaller than 1, ands wherein the first determination unit makes the degree of slanting of light larger as a dispersion of luminance values in the within-face skin area is larger.

11. The image capturing apparatus according to claim 1, wherein the first calculation unit calculates a median value of luminance values in the within-face skin area, sets an average value of luminance values equal to or higher than the median value to a representative luminance value of the light portions, and sets an average value of luminance values lower than the median value to a representative luminance value of the dark portions.

12. An image capturing apparatus comprising:

a first detection unit configured to detect a face area of a person, from an image captured by an image sensor;

a second detection unit configured to detect a skin area from the image;

a first calculation unit configured to calculate a representative luminance value of light portions and a representative luminance value of dark portions in a within-face skin area which is a skin area detected in the face area; and a correction unit configured to calculate, in a case where the representative luminance value of the light portions is higher than a first threshold value and at the same time the representative luminance value of the dark portions is lower than a second threshold value which is lower than the first threshold value, an exposure correction amount for correcting exposure at time of image capturing by the image sensor, such that a difference between the representative value of the light portions and the first threshold value, and a difference between the representative luminance value of the dark portions and the second threshold value become equal to each other.

13. An image capturing apparatus comprising:

a first detection unit configured to detect a face area of a person, from an image captured by an image sensor;

a second detection unit configured to detect a skin area from the image;

a first calculation unit configured to calculate a representative luminance value of light portions and a representative luminance value of dark portions in a within-face skin area which is a skin area detected in the face area;

a first determination unit configured to determine a correction parameter for the light portions, based on the representative luminance value of the light portions, and determine a correction parameter for the dark portions, based on the representative luminance value of the dark portions;

a generation unit configured to generate data for performing gradation correction of luminance values of the image, based on the correction parameter for the light portions and the correction parameter for the dark portions; and a correction unit configured to correct the luminance values of the image by using the data.

14. The image capturing apparatus according to claim 13, wherein the correction parameter for the light portions takes a value for making, in a case where the representative luminance value of the light portions is higher than a first predetermined threshold value, the representative luminance value of the light portions equal to the first predetermined threshold value, and wherein the correction parameter for the dark portions takes a value for making, in a case where the representative luminance value of the dark portions is lower than a second predetermined threshold value which is lower than the first predetermined threshold value, the representative luminance value of the dark portions equal to the second predetermined threshold value.

15. A method of controlling an image capturing apparatus, comprising:

detecting a face area of a person, from an image captured by an image sensor;

detecting a skin area from the image;

calculating a representative luminance value of light portions and a representative luminance value of dark portions in a within-face skin area which is a skin area detected in the face area;

determining a degree of slanting of light in the within-face skin area, based on the representative luminance value of the light portions and the representative luminance value of the dark portions; and calculating an exposure correction amount for correcting exposure at time of image capturing by the image sensor, based on the degree of slanting of light.

16. A non-transitory computer-readable storage medium storing a program for causing a computer to execute a method of controlling an image capturing apparatus, wherein the method comprises:

detecting a face area of a person, from an image captured by an image sensor;

detecting a skin area from the image;

calculating a representative luminance value of light portions and a representative luminance value of dark portions in a within-face skin area which is a skin area detected in the face area;

determining a degree of slanting of light in the within-face skin area, based on the representative luminance value of the light portions and the representative luminance value of the dark portions; and calculating an exposure correction amount for correcting exposure at time of image capturing by the image sensor, based on the degree of slanting of light.

* * * * *